United States Patent [19]
Carroll

[11] 3,757,674
[45] Sept. 11, 1973

[54] EGG COOKING DEVICE

[76] Inventor: Joseph E. Carroll, 13292 Anawood Way, Westminster, Calif. 92683

[22] Filed: Oct. 12, 1971

[21] Appl. No.: 188,149

[52] U.S. Cl. ............................... 99/440, 215/99.5
[51] Int. Cl. ....................................... A47j 43/18
[58] Field of Search .................... 99/440, 336, 426, 99/113, 161; 220/23, 83, 40, 59, 69; 215/99.5

[56] References Cited
UNITED STATES PATENTS

| | | | |
|---|---|---|---|
| 1,063,609 | 6/1913 | Shaw et al. | 99/440 X |
| 1,375,401 | 4/1921 | Luddy | 215/99.5 X |
| 2,700,249 | 1/1955 | Miller | 215/99.5 X |
| 2,845,477 | 7/1958 | Kelley et al. | 220/40 R X |
| 2,996,208 | 8/1961 | Schroeder | 215/99.5 |
| 3,161,156 | 12/1964 | Batista et al. | 99/440 UX |

FOREIGN PATENTS OR APPLICATIONS

| | | | |
|---|---|---|---|
| 742,280 | 12/1932 | France | 99/440 |
| 2,936 | 8/1875 | Great Britain | 99/440 |
| 526,482 | 5/1955 | Italy | 215/99.5 |

Primary Examiner—Billy J. Wilhite
Assistant Examiner—Arthur O. Henderson
Attorney—William C. Babcock

[57] ABSTRACT

First and second semi-ellipsoidal shells having first and second open end portions, which end portions have fastening means associated therewith to removably hold the end portions in sealing engagement. The first shell is of sufficient size to hold at least the yolk and white of one egg. When the shells are in sealing engagement and an egg disposed in the confined spaced defined by the shells, the shells may be placed in a body of heated water to cook the egg. A pedestal is provided that removably engages a portion of the first shell opposite the open end portion thereof, to hold the first shell in an upright position after the egg has been cooked and the second shell removed from the first shell. The pedestal is of substantial weight and, if desired, may be secured to the first shell during the cooking operation to assure that the first shell remains in an upright position in the heated water.

6 Claims, 4 Drawing Figures

Patented Sept. 11, 1973
3,757,674
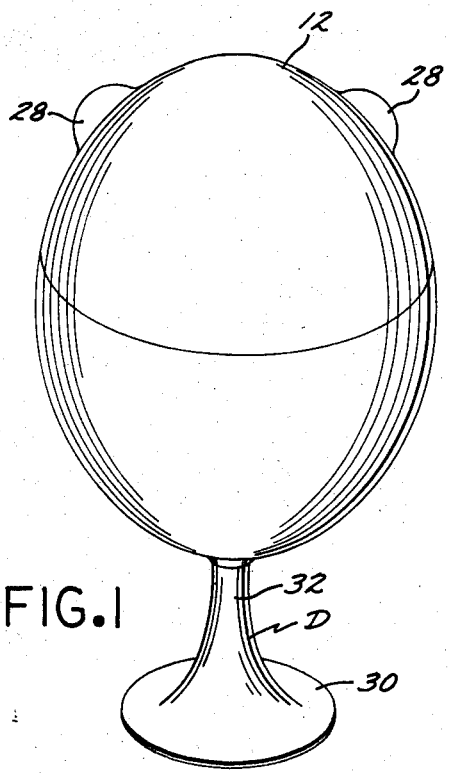
FIG.1
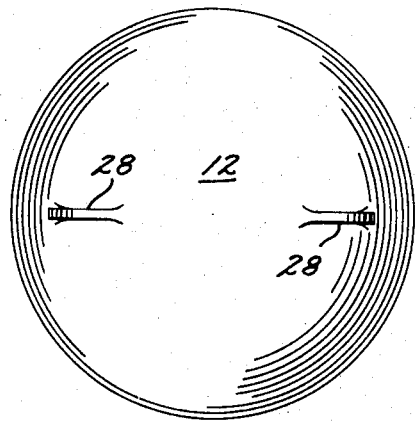
FIG.2
FIG.3
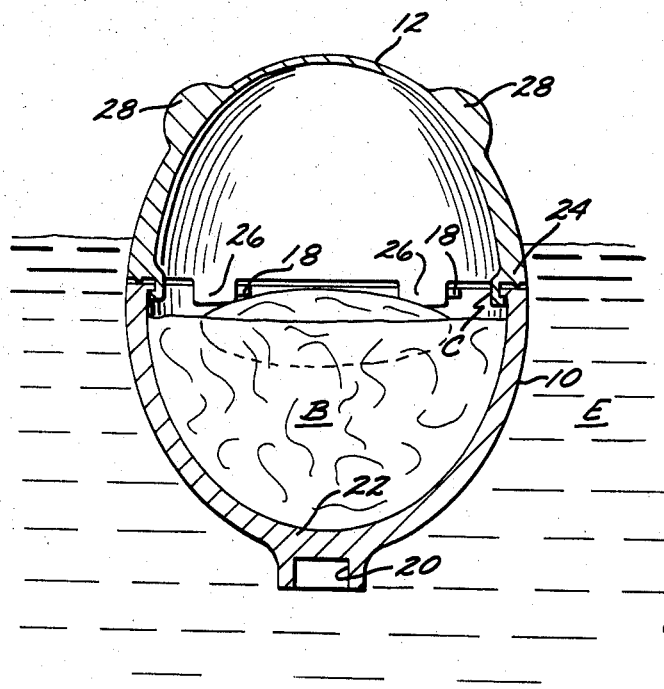
FIG.4
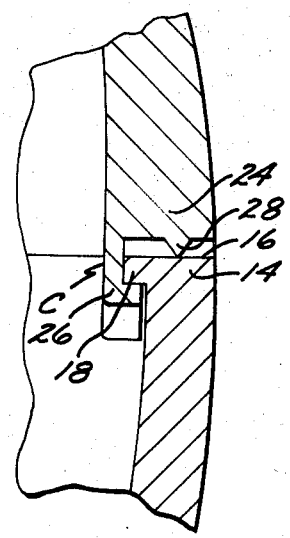
INVENTOR.
JOSEPH E. CARROLL
BY
William C. Babcock
ATTORNEY

EGG COOKING DEVICE

BACKGROUND OF THE INVENTION

1. Field of the Invention

A device for cooking eggs in heated water.

2. Description of the Prior Art:

For dietary reasons many persons do not desire eggs to be cooked in the fried or scrambled form where the oil, butter or other fat-containing materials become a part of the cooked egg. Such persons will normally prefer poached eggs. However, the poaching of an egg is a time-consuming operation and requires a certain amount of culinary skill. As an alternative to the above-mentioned methods of cooking eggs, it is well known that they may also be soft or hard boiled. Under present day conditions of egg production on a commercial scale, the eggs tend to have extremely thin shells and frequently break during the boiling of the eggs.

The primary purpose in devising the present invention is to provide a device of extremely simple structure that permits an egg to be cooked by the use of heated or boiling water, with the danger of the shell of the egg breaking during this operation being completely eliminated, as well as the frequent problems encountered when removing the egg from its natural shell after the cooking operation is completed.

Another object in devising the present invention is to provide not only a device that permits the cooking of an egg by the use of heated water, but also the device being provided with a pedestal to permit the lower portion thereof to remain in an upright position after the egg has been cooked, and thus serving as a table piece from which the egg may be eaten.

SUMMARY OF THE INVENTION

The egg cooking device includes a first semi-ellipsoidal shell formed from a substantially rigid, insoluble, heat-transferring and heat-resistant material and having a first open end that is defined by a circular edge portion in which a number of circumferentially spaced, longitudinally extending L-shaped slots are formed. A recess is formed in the first shell on the portion thereof opposite the open end thereof. The first shell is of such size as to hold at least the yolk and white of an egg.

A second semi-ellipsoidal shell is provided that is formed from a material having substantially the same physical qualities as the first shell. The second shell has a second open end of the same size as the first open end of the first shell. The second open end is defined by a second circular edge portion that sealingly engages the first edge portion, and with the second shell including a number of circumferentially spaced, outwardly projecting L-shaped prongs that removably interlock with the slots when the prongs are inserted therein, and the second shell thereafter rotated relative to the first shell. When the prongs and slots are in interlocking relationship as above described, the first and second edge portions of the first and second shells are in sealing contact with one another.

A pedestal is provided that may rest on a flat surface such as a table top or the like, with the pedestal having a free upper end portion that removably engages the recess formed in the first shell to hold the first shell and the cooked egg therein in an upright position. If desired, the pedestal, which is of substantial weight, may be secured to the first shell during the time the device is submerged in the body of heated water to assure that the first shell and the egg contained therein will remain in an upright position. The first and second shells, as well as the pedestal, may be molded from any one of a number of commercially available polymerized resins.

A major object of the present invention is to provide a device for cooking the yolk and white of at least one egg when the device is submerged in a body of heated or boiling water, and a device which will provide a cooked egg that is similar in consistency to a soft or hard boiled egg, but with the problems of the shell breaking during the cooking of the egg as well as removal of the egg from the shell after cooking being eliminated.

Another object of the present invention is to provide a device of simple structure for the cooking of an egg that may be formed of three separate parts from a polymerized resin, with the first and second parts being semi-ellipsoidal shells that may be removably secured to one another to provide a confined space in which an egg may be cooked; and the third part being a pedestal upon which the first egg-containing shell may be removably mounted in an upright position to permit the cooked egg to be eaten therefrom.

A still further object of the invention is to supply a device for cooking an egg that is simple and convenient to use and one that may be easily formed from a polymerized resin by an injection molding operation or the like.

BRIEF DESCRIPTION OF THE DRAWINGS

FIG. 1 is a perspective view of the egg cooking device in the assembled condition;

FIG. 2 is a top plan view of the device;

FIG. 3 is a longitudinal cross-sectional view of the egg cooking device showing a yolk and white of an egg situated therein, with the device being exposed to a heated body of water in which it is at least partially submerged; and FIG. 4 is an enlarged fragmentary cross-sectional view of a portion of the first and second shells, illustrating in detail the means used in removably fastening the same together during the cooking of an egg.

DESCRIPTION OF THE PREFERRED EMBODIMENT

The device A for use in cooking the white and yolk of at least one egg B is shown in the assembled condition in both FIGS. 1 and 3. The device A includes a first semi-ellipsoidal shell 10 that is removably engaged by a second semi-ellipsoidal shell 12, with the first and second shells 10 and 12 being removably held together in sealing engagement by locking means C, shown in detail in FIG. 4.

A pedestal D is provided, as may best be seen in FIG. 1, which pedestal is adapted to rest on a flat, horizontal surface of a table or the like (not shown), and when so disposed may removably engage the first shell 10 to hold the latter in an upright position where the cooked egg B situated therein may be eaten therefrom. This pedestal D, if desired, may be secured to the first shell 10 when the latter shell is immersed in a body of heated water E, as shown in FIG. 3, to assure that the first and second shells 10 and 12 will remain in an upright position in the body of water E.

The first and second shells 10 and 12 are preferably formed from a polymerized resin that is dimensionally stable, is insoluble in heated or boiling water, and has the ability to transfer heat from the body of water E to the egg B being cooked.

The first shell 10, as may best be seen in FIG. 3, has a first circular open end portion 14 that includes a flat circular surface 16 and a number of circumferentially spaced, longitudinally extending slots 18 of L-shaped configuration being formed in the upper interior portion of the first shell 10. The first shell 10, opposite the open end portion 14 thereof, is provided with a longitudinally oriented recess 20 on the exterior thereof, which recess is formed in a portion 22 of the shell 10 that is of greater thickness than the balance of the shell.

The second shell 12, as may be seen in FIG. 3, is also of semi-ellipsoidal shape and has a second end portion 24 of circular shape that includes a number of circumferentially spaced, downwardly extending L-shaped prongs 26 and has a continuous circular ring projecting outwardly from the second end portion 24 thereof, which ring is in sealing contact with the surface 16 when the prongs 26 and slots 18 are in fastening engagement with one another.

The second shell 12, as may best be seen in FIG. 3, h s two laterally spaced handles 28 projecting outwardly therefrom that provide an easy and convenient means for rotating the second shell 12 relative to the first shell 10 to place the prongs 26 in fastening engagement with slots 18, or to remove the prongs 26 from engagement with the slots 18 by relative rotation of the first and second shells 10 and 12.

The pedestal D, as may best be seen in FIG. 1, includes a base 30 that has an upright 32 projecting therefrom, with the upper free end portion of the upright 32 capable of removably and frictionally engaging the recess 20 to removably secure the pedestal D to the first shell 10.

The pedestal D, as previously mentioned, may be supported on a flat surface (not shown) and when so supported engages the recess 20 to hold the first shell 10 in an upright position whereby the cooked egg B may be eaten therefrom after the second shell 12 has been removed from the first shell. The pedestal D, which is of substantial weight, may also be removably secured to the first shell 10, as shown in FIG. 1, to assure that the first shell 10 will remain in an upright position in a body of heated water E, as previously explained, when an egg is situated within the first shell 10 and the second shell 12 is removably secured to the first shell, as shown in FIG. 1.

The use and operation of the invention has been described previously in detail and need not again be repeated.

I claim:

1. A device for cooking an egg when said device is disposed in a receptacle containing heated water, said device including:
   a. a first semi-ellipsoidal shell formed from a substantially rigid, insoluble, heat-transferring, heat-resistant material, said first shell having a first open end that is defined by a circular first edge portion in which a number of circumferentially spaced, longitudinally extending L-shaped slots are formed, with said first shell having a recess formed therein in a portion thereof opposite said open end, with said first shell of such size as to hold at least the yolk and white of one egg;
   b. a second semi-ellipsoidal shell formed from a material of substantially the same physical characteristics as that of said first shell, said second shell having a second open end of the same size as said first open end, said second open end being defined by a second circular edge portion that sealingly engages said first edge portion, and said second shell including a number of circumferentially spaced, outwardly projecting L-shaped prongs that removably interlock with said slots in said first shell when said prongs are inserted in said slots and said first and second shells rotated relative to one another, and said prongs and slots when so interlocked holding said first and second edge portions in sealing contact with one another; and
   c. pedestal means that removably engage said recess to hold said first shell in an upright position after said egg has been cooked and said second shell has been removed from said first shell, as well as capable of being used to assure that said first shell will remain in an upright position in said heated water during the cooking of said egg.

2. A device as defined in claim 1 which in addition includes:
   d. handle means on the exterior of said second shell to permit said second shell to be rotated relative to said first shell.

3. A device as defined in claim 1 in which said first edge portion includes a first flat circular surface and said second edge portion includes a circular, outwardly projecting ring that sealingly contacts said first flat surface.

4. A device as defined in claim 3 in which said ring is of triangular transverse cross section.

5. A device as defined in claim 1 in which said pedestal means is of substantial weight and includes:
   d. a base; and
   e. an upright projecting from said base, with said upright having a free extremity that frictionally and removably engages said recess.

6. A device for cooking at least the yolk and white of one egg when said device is immersed in a body of heated water, said device including:
   a. first and second semi-ellipsoidal shells formed from an insoluble, dimensionally stable, heat-conducting material, said first and second shells having first and second open ends of substantially the same size that are defined by first and second circular edge portions, said first shell of such size as to be capable of holding at least the yolk and white of one egg;
   b. first means for removably holding said first and second edge portions in sealing contact during the cooking of said egg; and
   c. pedestal means removably affixable to said first shell to hold said shell in an upright position after said device has been removed from said body of water and said second shell separated from said first shell.

* * * * *